(12) United States Patent
Farley et al.

(10) Patent No.: US 8,011,412 B2
(45) Date of Patent: Sep. 6, 2011

(54) TIRE REMOVAL AID FOR LARGE TIRES TO MINIMIZE / ELIMINATE SCUFFING OF THE WHEEL

(75) Inventors: J. Stephen Farley, Franklin, KY (US); Bill Cropper, Woodburn, KY (US); Clay Spivey, Franklin, KY (US)

(73) Assignee: Melzo Innovations, Franklin, KY (US)

( * ) Notice: Subject to any disclaimer, the term of this patent is extended or adjusted under 35 U.S.C. 154(b) by 223 days.

(21) Appl. No.: 11/969,828

(22) Filed: Jan. 4, 2008

(65) Prior Publication Data

US 2008/0185106 A1 Aug. 7, 2008

Related U.S. Application Data

(60) Provisional application No. 60/883,392, filed on Jan. 4, 2007.

(51) Int. Cl.
*B60C 25/01* (2006.01)
*B60B 30/08* (2006.01)

(52) U.S. Cl. .................. 157/14; 157/1.1; 157/1
(58) Field of Classification Search .......... 157/14, 157/1.1, 1.24, 16, 1
See application file for complete search history.

(56) References Cited

U.S. PATENT DOCUMENTS

| | | | | |
|---|---|---|---|---|
| 2,418,849 A * | 4/1947 | Polt | ................ | 157/1.24 |
| 3,580,320 A * | 5/1971 | Roberts | ................ | 157/21 |
| 3,583,238 A * | 6/1971 | Haynes | ................ | 73/487 |
| 3,742,766 A * | 7/1973 | Mitchell | ................ | 73/484 |
| 3,888,128 A * | 6/1975 | Mitchell | ................ | 73/484 |
| 4,046,018 A * | 9/1977 | Lasiter | ................ | 73/482 |
| 4,167,118 A * | 9/1979 | Hihara | ................ | 73/487 |
| 4,357,977 A * | 11/1982 | Bubik | ................ | 157/1.28 |
| 4,462,253 A * | 7/1984 | Becher | ................ | 73/487 |
| 5,088,539 A * | 2/1992 | Mannen et al. | ........... | 157/1.17 |
| 6,145,566 A * | 11/2000 | Kliskey | ............ | 157/1.17 |
| 6,840,522 B2 * | 1/2005 | Merrifield | ............ | 279/8 |
| 6,862,785 B2 * | 3/2005 | Baumgartner | ............ | 29/26 A |
| 6,918,599 B2 * | 7/2005 | Patterson et al. | ........ | 279/106 |
| 7,077,006 B2 * | 7/2006 | Hansen | ............ | 73/487 |
| 7,204,493 B1 * | 4/2007 | Gatton | ............ | 279/106 |
| 7,293,595 B2 * | 11/2007 | Gonzaga | ........... | 157/14 |
| 7,353,610 B2 * | 4/2008 | Gerdes et al. | .......... | 33/203 |

* cited by examiner

*Primary Examiner* — David B Thomas
(74) *Attorney, Agent, or Firm* — Waddey & Patterson, P.C.; Phillip E. Walker

(57) ABSTRACT

An apparatus for protecting the exterior or polished surface of wheels as tires are removed and placed on the wheel. The apparatus includes a substantially flat base having a plurality of stanchions extending out from the base. Each stanchion has a collar positioned adjacent to the base that includes a diameter greater than the stanchion. The stanchions are sized to fit through the bolt holes of the wheel in order to generally align each stanchion with one of those holes. Each collar is sized to be preferably slightly larger than the average bolt, or lug, hole on the wheel. Additionally, each collar is sized to cover substantially the same area as the lug nut or nut that normally attaches the wheels to the vehicle upon which they are used.

19 Claims, 3 Drawing Sheets

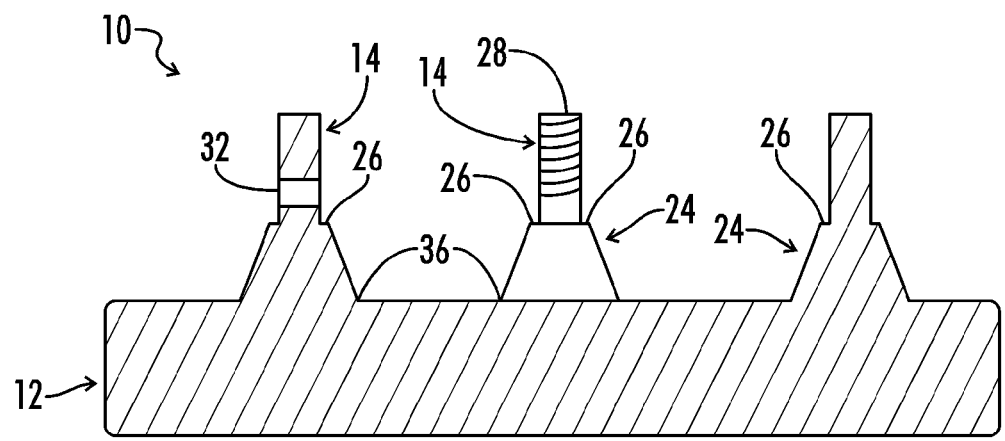
FIG. 5
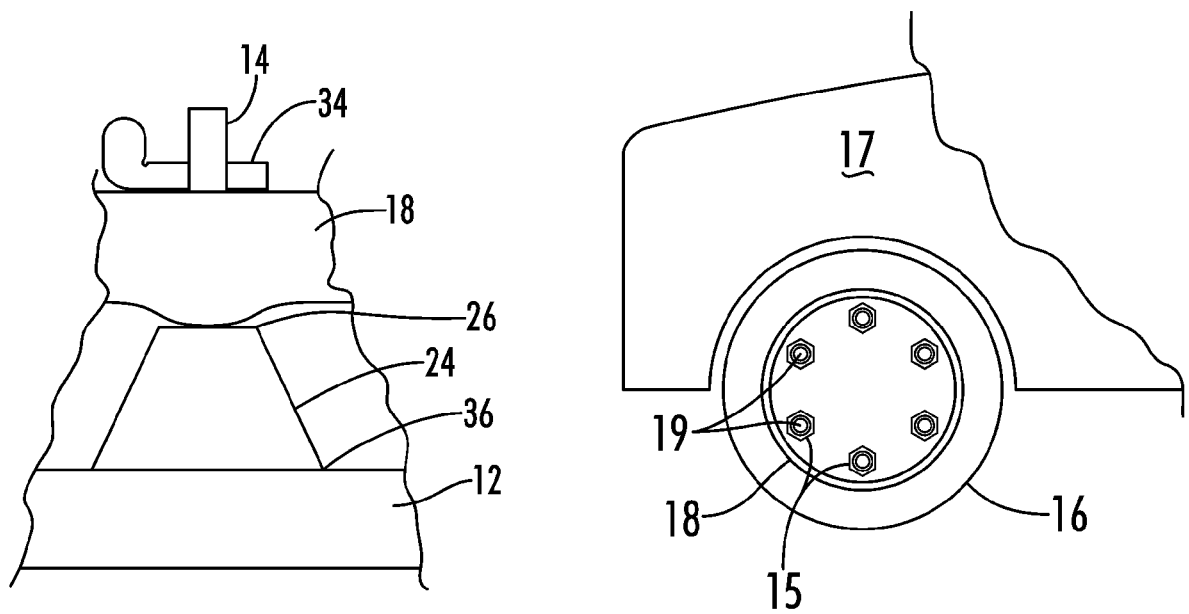
FIG. 6
FIG. 7

TIRE REMOVAL AID FOR LARGE TIRES TO MINIMIZE / ELIMINATE SCUFFING OF THE WHEEL This application claims priority to U.S. patent application Ser. No. 60/883,392 filed Jan. 4, 2007, entitled "Tire Removal Aid For Large Tires To Minimize/Eliminate Scuffing Of The Wheel", which is hereby incorporated by reference in it entirety.

J. Stephen Farley, a citizen of the United States, residing at 1780 Turner Town Road, Franklin, Ky. 42134, Bill Cropper, a citizen of the United States, residing at 482 Sloss Road, Woodburn, Ky. 42170, and Clay Spivey, a citizen of the United States, residing at 1550 Craft Road, Franklin, Ky. 42134, have invented a new and useful "Tire Removal Aid For Large Tires To Minimize/Eliminate Scuffing Of The Wheel."

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND OF THE INVENTION

The present invention relates generally to tire removal. More specifically, the present invention relates to tire removal for large tires to minimize or eliminate scuffing Almost all vehicles that travel the roads these days are supported by wheels, or rims, circumferentially supported by tires. The tires are in direct contact with the road and typically composed of material that eventually wears. As such the tires need to be periodically replaced.

The owners, and normally the drivers, of numerous types of these vehicles take pride and care in the appearance of their vehicle. This pride and care can be seen in various customizations and features in the vehicles themselves including added features and specialized paint. Some of these owners also use specialized tires and wheels. This is true for numerous owners of numerous types of vehicles, including the owners and drivers of large vehicles such as commercial trucks, buses, and the like.

One area in which these owners and drivers take pride is the appearance of the wheels, or rims, on which the tires are attached. For example, numerous owners and drivers have a shiny metallic or chrome appearance to their wheels and prefer those wheels to have a finished and/or polished look. To get the look desired, numerous owners have their wheels professionally polished.

The general maintenance of these high stylized wheels can normally be maintained through periodic washing during normal operation of the vehicle. However, when the tires that are attached to these wheels become used and in need of replacement, the wheels are removed from the vehicle and the tires replaced.

This removal and replacement process is conventionally accomplished by placing the wheel and tire on the ground, such as the vehicle maintenance floor, and then using tools to remove the tire from the wheel. Normally the internal surface of the wheel, the surface facing the vehicle during normal operation, must be accessed in order to remove the tire from the wheel. This typically necessitates placing the high polished surface, or the surface facing away from the vehicle during normal operation, on the ground. This positioning of the wheel's surface on the ground unfortunately causes scuffing of the high polished exposed surfaces of the wheel during the tire removal and replacement process. This can be an issue since the cost to polish the exposed surfaces for these large wheels can run into hundreds if not thousands of dollars per polishing, especially for vehicles that operate on more than four wheels and tires.

Typical prior attempts to stop this scuffing have relied on pads or cushioning of some type to be placed on the ground. These attempts have tried to soften the engagement between the polished wheel surface and the ground. This unfortunately has not alleviated the problem. These padded surfaces do not normally provide the adequate protection to the high polished metal surfaces of the wheels and can become dirty and hold grit and grime. As such the padded surfaces after one or two uses scratch the high polish surface of the wheel and impart dirt and other particles to those polished surfaces thereby reducing the aesthetic appeal of those wheels.

What is needed then is a new apparatus and method of maintaining the polished surface to wheels, especially large wheels, when the tire attached to those wheels are removed and replaced. This needed apparatus preferably maintains the high polished surface of the wheel during the tire removal and exchange process. This needed apparatus and method are lacking in the art.

BRIEF SUMMARY OF THE INVENTION

Disclosed herein is an apparatus for protecting the exterior, exposed, or polished surface of wheels as a tire is removed and placed on the wheel. The apparatus includes a substantially flat base having a plurality of stanchions extending out from the base. Each stanchion, or post, has a collar positioned adjacent to the base and includes a diameter greater than the stanchion. The posts are sized and spaced to fit through the bolt holes of the wheel in order to generally align each post with one of those holes. Each collar is sized to be larger, and preferably slightly larger, than the average bolt, or lug, hole on the wheel.

Additionally each collar is sized to cover substantially the same area as the lug nut, or nut, that normally attaches the wheels to the vehicle upon which they are used. As such, the contact between the wheel and the apparatus is limited to substantially the same surface area to which the lug nuts engage the wheel when the wheel is attached to the vehicle. This way the high polished surfaces of the wheel are suspended from engagement with the device and the ground such that when the tire is removed or added onto the wheel those high polished surfaces cannot typically engage the device or the ground and the risk of scratching those high polished surfaces is very limited.

The device can further include an attachment nut which is threaded onto the stanchion to removeably fix the wheel in relationship to the base. This secures the wheel to the device and allows the tire to be removed from the wheel by convention removal techniques. Alternately, the device can include a pin that fits in one or more apertures in the post in order to removeably secure the wheel to the device. In yet another alternate embodiment the post can include a series of grooves in which a quick clamp device can slide onto and engage the normally hidden polished surface or even the non-polished surface of the wheel and secure the wheel to the device.

It is therefore a general object of the present invention to provide a device to assist in the removal of tires from wheels.

Another object of the present invention is to provide a device that protects the high polished surface of wheels as tires are removed and added thereto.

Still yet another object of the present invention is to provide a device that is used in the removal and addition of tires to wheels such that the device engages a reduced area of the polished surface of the wheel.

Still yet another object of the present invention is to provide a device that substantially limits its engagement with a wheel to a surface area mount that is approximately equal to or less than the polished surface area that is used to attach the wheel to a vehicle.

Other and further objects, features and advantages of the present invention will be readily apparent to those skilled in the art upon reading of the following disclosure when taken in conjunction with the accompanying drawings.

BRIEF DESCRIPTION OF THE SEVERAL VIEWS OF THE DRAWINGS

FIG. 5 is a cross sectional view of an alternate embodiment of a device made in accordance with the current disclosure.

FIG. 6 is a partial cross sectional view of an alternate securement of a wheel to a device made in accordance with the current disclosure.

FIG. 7 is a partial view of a tire and wheel attached to a vehicle.

DETAILED DESCRIPTION OF THE INVENTION

Figure 1:
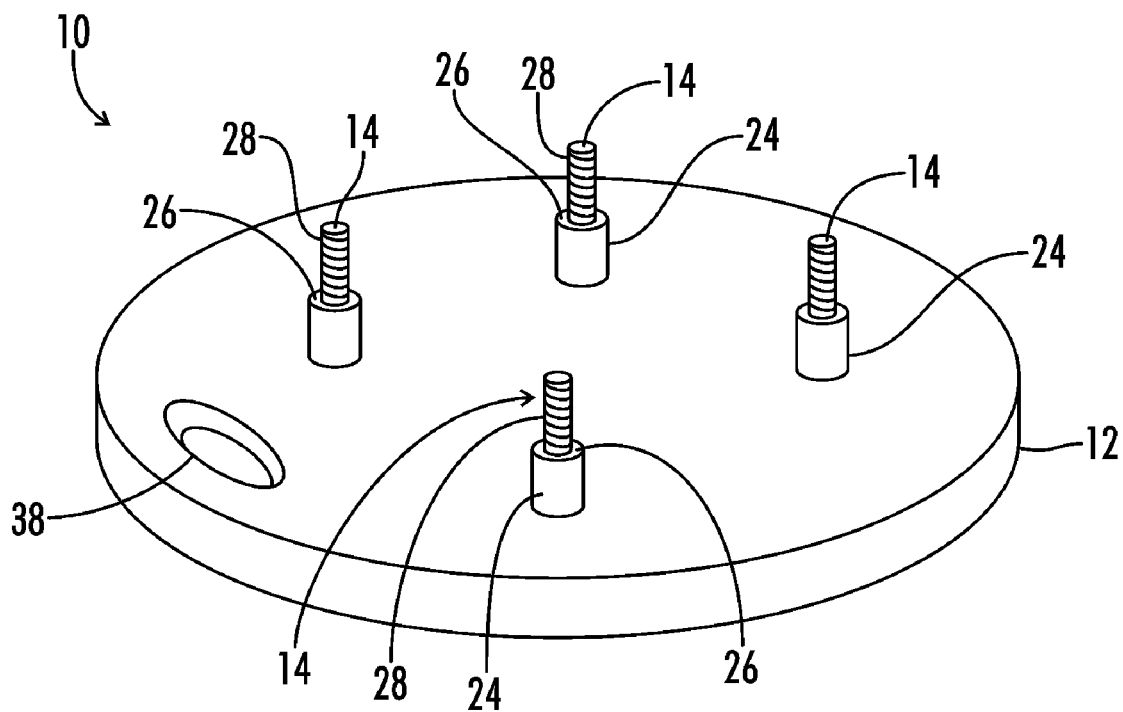
FIG. 1 is a perspective view of a device made in accordance with the current disclosure.
Figure 2:
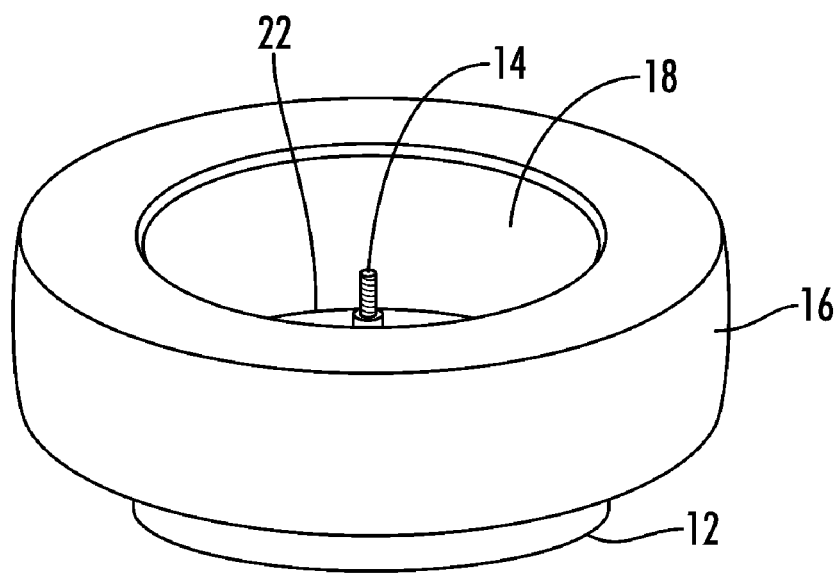
FIG. 2 is a perspective view of a tire around a wheel with both positioned on a device made in accordance with the current disclosure.

Referring generally now to FIGS. 1-7, a device for assistance in tire removal and addition to a wheel is shown and generally designated by the numeral 10. The device 10 includes a base 12 and a plurality of stanchions 14. The device 10 assists in the removal of a tire 16 from a wheel 18 and has particular application in the aid of removal of large tires 16 from large wheels 18 used for commercial trucks, buses, and the like. The wheel 18 has a polished side 20 and an unpolished side 22 and the device 10 aids in the removal and addition of the tire 16 to the wheel 18 while protecting the finish of the polished side 20 of the wheel 18.

In a preferred embodiment, each stanchion 14, which can also be described as a post 14, includes a collar 24 positioned adjacent to and engaging the base 12. The collar 24 has a diameter, which can be described as an expanded diameter, that is greater than the diameter of the post 14. The collar 24 has a top portion 26, which can include a top surface, engagement surface, or contact surface, designed to engage the polished surface 20 of the wheel 18 and to protect the remainder of the polished surface 20 from engagement with the device 10 or the surrounding ground.

Each post 14 can include a threaded end 28 positioned opposite the collar 24 and a threaded fastener 30, or nut 30, can be threaded on the threaded end 28 to secure the wheel 18 to the device 10. This securement allows for the normal removal and addition of the tire 16 with respect to the wheel. Alternately each post 14 can include apertures 32, or holes 32, positioned to accept a pin 34 to secure the wheel 18 to the device 10. In still yet another embodiment a quick clamp device can be used to engage openings or slats in each post 14 to quickly secure and release the wheel 18 in relation to the device 10. All of these securing techniques between the wheel 18 and the device 10 facilitate the normal addition and removal of a tire 16 to or from the wheel 18.

Figure 3:
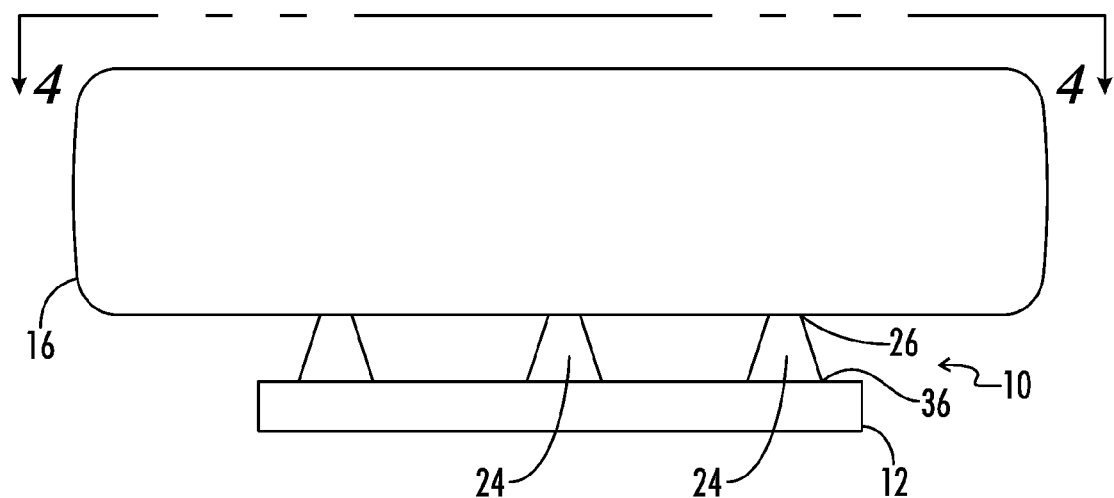
FIG. 3 is a side view of FIG. 2.
Figure 4:
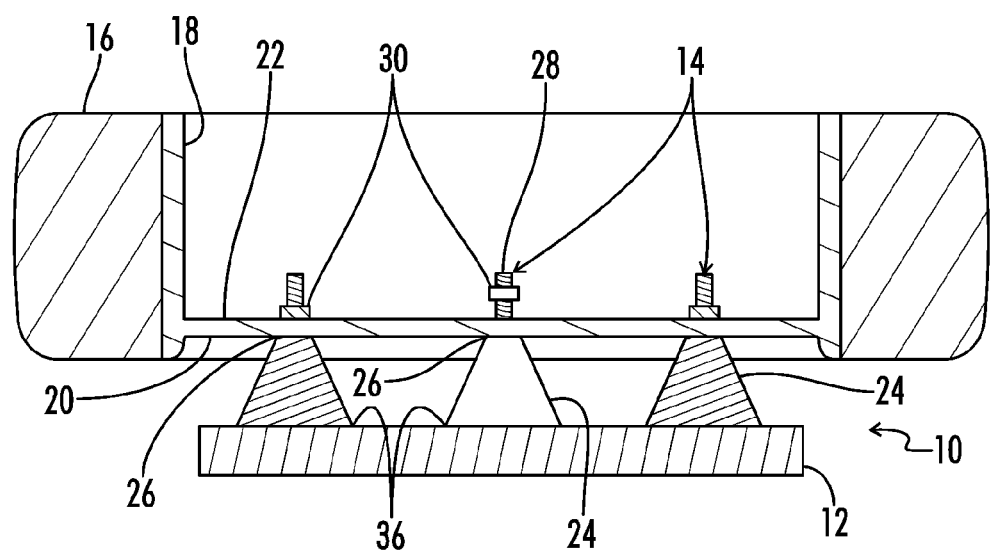
FIG. 4 is a cross sectional view taken along line 4-4 of FIG. 3.

As can best be seen in FIGS. 3, 4 and 6, the device 10, and more particularly the collar 24 are designed to engage the polished surface 20 in order to protect the overall finish of that polished surface 20. The collar 24 can have a substantially consistent outside diameter. Alternately, the collar 24 can have a wide portion 36 engaging the base 12 and while the top portion 26 is spaced from the base 12 and having a smaller diameter with respect to the wide portion 36.

For example, the collar 24 can have a frustoconical shape such that the portion, such as the top portion 26, spaced from the base 12 has a smaller diameter than the portion of the collar 24 that engages the base 12. As such, the top portion 26 engages the polished surface 20 and spaces the polished surface 20 from the base 12. In this embodiment, the top portion 26 has a smaller diameter than the bottom portion 36 and a smaller diameter than the base 12 to reduce the amount of surface area contact between the device 10 and the wheel 18 during addition and removal of the tire 16 to the wheel 18. This effectively protects the finish of the polished surface 20 by allowing a small amount of surface contact between the wheel 18, and specifically the polished surface 20, and the device 10. The device also effectively spaces the wheel 18 from contacting the ground.

In a preferred embodiment the collar 24 can take the shape of a lug nut. The lug nut shape can be approximately the same in size as a lug nut 15 that normally engages the polished surface 20 when the wheel 18 is attached to a vehicle 17 engages the base 12. A simple engagement between a tire 16 and wheel 18 to a vehicle 17 is shown in FIG. 7. In this FIG. 7 several lug nuts 15 are used to attach to bolts, or stems, 19 extending from the vehicle. As such, when the current device uses a contact area 26 that is equal to or less than the diameter of the typical lug nut that attaches the wheel 18 to the vehicle 17, any potential engagement and/or scratches that could occur on the polished surface 20 will be hidden when the lug nuts 15 are then used to reattach the wheel 18 and tire 16 back to the vehicle 17.

The figures show a total of four posts 14 that at least partially pass through the base 12 and extend from the base 12 to engage the wheel 18 for addition and removal of a tire 16. The number of post can vary as long as the wheel 18 is adequately supported by the device 10, for example three posts 14 could be adequate, or the number of posts 14 could replicate the typical number of attachments between the wheel 18 and vehicle 17 which is normally six or eight depending on vehicle size and usage.

The device 10 can be made of many materials but in a preferred embodiment the base 10 is a durable yet lightweight material, such as an engineered wood, fiberglass, plastic, or the like, while the posts 14 are more durable in nature and can be composed of metal. For example the posts 14 can be bolts while the collar 24 can be lug nuts. In an alternate embodiment the entire device 10 can be molded and composed of a durable, yet lightweight plastic such that the device 10 is made as one integral piece, as exampled in FIG. 5.

A portion of the middle of the base 12 can be removed to reduce the weight and a handle 38 can be added to increase the portability of the device 10. The device 10 is such that it is portable in nature and can be moved as needed from various locations during maintenance of the vehicle and removal of the tire 16 from the wheel 18. The device 10 can be positioned on a table or on the ground or working surface as needed to facilitate removal of the tire 16.

Thus, although there have been described particular embodiments of the present invention of a new and useful Tire Removal Aid For Large Tires To Minimize/Eliminate Scuffing Of The Wheel, it is not intended that such references be construed as limitations upon the scope of this invention except as set forth in the following claims.

What is claimed is:

1. A device to aid in tire removal from and placement on a wheel, the wheel having a polished surface and a plurality of attachment orifices, each attachment orifice having an orifice diameter, the device comprising:
   a base; and
   a plurality of stanchions extending from the base, each stanchion including an expanded diameter proximate the base, each expanded diameter is greater than the orifice diameter and includes a substantially flat engagement surface positioned to engage the polished surface of the wheel proximate to and surrounding the orifice diameter, and each engagement surface positioned to space the wheel from the base during tire removal from and placement on the wheel, with the engagement surface positioned to eliminate contact of the wheel to the base.

2. The device of claim 1, wherein the expanded diameter includes a wide portion positioned between the base and the engagement surface, the wide portion including a diameter greater than the diameter of the engagement surface.

3. The device of claim 1, wherein the expanded diameter is frustoconical in shape.

4. The device of claim 1, wherein the number of stanchions corresponds to the number of attachment orifices.

5. The device of claim 1, wherein the engagement surface eliminates contact of the wheel to the base.

6. The device of claim 1, further including a threaded fastener and each stanchion includes a threaded end shaped to accept the threaded fastener, wherein the threaded fastener, threaded end, and engagement surface secure the wheel to the device.

7. The device of claim 1, further including a pin and each stanchion includes a stanchion aperture shaped to accept the pin, wherein the pin, stanchion aperture, and engagement surface secure the wheel to the device.

8. The device of claim 1, wherein the expanded diameter is a lug nut.

9. The device of claim 1, wherein the base is composed of plastic and the stanchion is composed of metal.

10. The device of claim 1, wherein the base and stanchion are composed of a single piece of molded plastic.

11. A device to aid in tire removal from and placement on a wheel wherein the wheel includes a polished surface having a lug nut contact surface area and a plurality of attachment orifices, each attachment orifice having an orifice diameter, the device comprising:
   a base shaped to space the wheel and tire from the ground;
   a plurality of posts extending from the base, each post including a collar having a substantially flat collar contact surface area, wherein the collar contact surface area is less than the lug nut surface area for the polished surface of the wheel and greater than the orifice diameter; and
   wherein the collar contact surface area engages the polished surface only in the lug nut surface area and spaces the polished surface and the wheel from the base during tire removal from and placement on the wheel.

12. The device of claim 11, wherein the each post includes a post diameter and each collar includes a collar diameter greater that the post diameter.

13. The device of claim 11, wherein the collar is frustoconical in shape.

14. The device of claim 11, wherein the number of posts corresponds to the number of attachment orifices.

15. The device of claim 11, further including a threaded fastener and each post includes a threaded end shaped to accept the threaded fastener, wherein the threaded fastener, threaded end, and collar secure the wheel to the device.

16. The device of claim 11, further including a pin and each post includes a post aperture shaped to accept the pin, wherein the pin, post aperture, and collar secure the wheel to the device.

17. A device to aid in tire removal from and placement on a wheel, the wheel including a plurality of attachment orifices and a polished surface having a lug nut contact surface area, each attachment orifice having an orifice diameter, the device comprising:
   a base shaped to space the wheel and tire from the ground;
   a plurality of posts extending from the base, each post including a collar having a collar diameter defining a substantially flat collar contact surface area, each collar contact surface area is less than the lug nut surface area for the polished surface of the wheel and each collar diameter is greater than the orifice diameter; and
   wherein each collar contact surface area is positioned to only engage the lug nut surface area of the polished surface of the wheel proximate to and surrounding the orifice diameter and space the wheel from the base during tire removal from and placement on the wheel.

18. The device of claim 17, further including a threaded fastener and each post includes a threaded end shaped to accept the threaded fastener, wherein the threaded fastener, threaded end, and collar secure the wheel to the device.

19. The device of claim 17, further including a pin and each post includes a post aperture shaped to accept the pin, wherein the pin, post aperture, and collar secure the wheel to the device.

* * * * *